United States Patent
Lipp et al.

(10) Patent No.: US 8,633,428 B2
(45) Date of Patent: Jan. 21, 2014

(54) SCANNING UNIT OF A POSITION MEASURING ARRANGEMENT THAT INCLUDES A LIGHT SOURCE THAT PROVIDES INFORMATION REGARDING AN AMPLITUDE OF A SCANNING SIGNAL

(75) Inventors: Friedrich Lipp, Ostermiething (AT); Ludwig Schlichtner, Hochburg-Ach (AT)

(73) Assignee: Dr. Johannes Heidenhain GmbH, Traunreut (DE)

( * ) Notice: Subject to any disclaimer, the term of this patent is extended or adjusted under 35 U.S.C. 154(b) by 426 days.

(21) Appl. No.: 12/927,439

(22) Filed: Nov. 15, 2010

(65) Prior Publication Data

US 2011/0116102 A1 May 19, 2011

(30) Foreign Application Priority Data

Nov. 17, 2009 (DE) .......................... 10 2009 046 773

(51) Int. Cl.
 *G01J 1/32* (2006.01)
(52) U.S. Cl.
 USPC ............................ 250/205; 356/614; 359/439
(58) Field of Classification Search
 USPC ................ 250/231.13–231.18; 356/616–619; 359/436–442; 33/1 PT, 1 N
 See application file for complete search history.

(56) References Cited

U.S. PATENT DOCUMENTS

| 5,241,173 | A | 8/1993 | Howley et al. |
| 6,807,499 | B2 | 10/2004 | Burgschat et al. |
| 2004/0026603 | A1 | 2/2004 | Burgschat et al. |
| 2004/0129870 | A1* | 7/2004 | Strasser ................... 250/231.13 |
| 2005/0072911 | A1* | 4/2005 | Kuroda et al. ............ 250/231.13 |
| 2006/0180748 | A1* | 8/2006 | Schoser et al. ................. 250/221 |
| 2006/0186324 | A1* | 8/2006 | Muenter ................... 250/231.13 |

FOREIGN PATENT DOCUMENTS

| DE | 44 28 673 A1 | 2/1996 |
| DE | 101 57 112 A1 | 6/2003 |
| EP | 0 514 081 B1 | 2/1996 |

\* cited by examiner

*Primary Examiner* — Francis M Legasse, Jr.
(74) *Attorney, Agent, or Firm* — Brinks Gilson & Lione

(57) ABSTRACT

A scanning unit of a position measuring unit for scanning a scale, the scanning unit including a display unit having a light source. The scanning unit further including a regulating device for controlling an amplitude of an analog scanning signal of the scanning unit, wherein the regulating device triggers the light source to cause a change of an illumination state of the light source, wherein successive changes of the illumination state of the light source contain information regarding the amplitude of the analog scanning signal.

7 Claims, 3 Drawing Sheets

| Amplitude | Blinking | Luminosity | |
| --- | --- | --- | --- |
| | | Green [%] | Red [%] |
| 1,35V-1,45V | 5x | 42,9 | 57,1 |
| 1,25V-1,35V | 4x | 57,1 | 42,9 |
| 1,15V-1,25V | 3x | 71,4 | 28,6 |
| 1,05V-1,15V | 2x | 85,7 | 14,3 |
| 0,95V-1,05V | 1x | 100 | 0 |
| 0,85V-0,95V | 2x | 85,7 | 14,3 |
| 0,75V-0,85V | 3x | 71,4 | 28,6 |
| 0,65V-0,75V | 4x | 57,1 | 42,9 |
| 0,55V-0,65V | 5x | 42,9 | 57,1 |
| 0,45V-0,55V | 6x | 28,6 | 71,4 |
| 0,35V-0,45V | 7x | 14,3 | 85,7 |
| 0,25V-0,35V | 8x | 0 | 100 |
| 0,15V-0,25V | 8x | 0 | 100 |
| 0,00V-0,15V | 8x | 0 | 100 |

SCANNING UNIT OF A POSITION MEASURING ARRANGEMENT THAT INCLUDES A LIGHT SOURCE THAT PROVIDES INFORMATION REGARDING AN AMPLITUDE OF A SCANNING SIGNAL

RELATED APPLICATIONS

Applicants claim, under 35 U.S.C. §119, the benefit of priority of the filing date of Nov. 17, 2009 of a German patent application, copy attached, Serial Number 10 2009 046 773.4, filed on the aforementioned date, the entire contents of which is incorporated herein by reference.

BACKGROUND

1. Technical Field

The present invention relates to a scanning unit of a position measuring arrangement. The scanning unit includes a regulating device for controlling the amplitude of at least one analog scanning signal of the scanning unit and a display unit for signalizing the size of the amplitude.

2. Background Information

The control of the scanning signals is in particular required during mounting of the scanning unit. The signal quality, and therefore the accuracy of measurement, depends to a considerable extent on the exact adjustment of the scanning unit relative to the scale. In order to assure a high degree of accuracy in connection with incremental position-measuring arrangements, the scanning signals generated by the scanning unit should be of large and have equal amplitudes, and have a mutual phase offset of 90° as well. Amplitude is essentially determined by the position of the scanning unit relative to the scale, this means distance, twist and lateral displacement of the scanning unit relative to the scale.

In accordance with EP 0 514 081 B1, the scanning signals are supplied to a regulating device, which compares the amplitude with a threshold limit. If the amplitude lies below this threshold value, a display unit is activated, which is used as an indication that the scanning unit has been incorrectly installed in relation to the scale.

It is disadvantageous here that the display unit only indicates by the illumination of a green or a red light source whether the scanning head has been correctly or incorrectly installed.

It had already been noted that this indication alone is not sufficient for the installation, and that it would be advantageous for the user to also receive an indication regarding the actual size of the amplitude. In connection with this it has now been proposed in DE 101 57 112 A1 to compare the amplitude of the scanning signal with a predetermined desired value and, depending on the size of the deviation, the light luminosity of a light source as the display unit varies.

In this connection, it is disadvantageous that the association of the light luminosity and the amplitude size is difficult for the user.

OBJECTS AND SUMMARY OF THE INVENTION

An object of the present invention is therefore based on disclosing a scanning device by which an indication can be generated which allows an improved statement regarding the state of the amplitude of at least one position-dependent scanning signal.

This object is attained by a scanning unit of a position measuring unit for scanning a scale, the scanning unit including a display unit having a light source. The scanning unit further including a regulating device for controlling an amplitude of an analog scanning signal of the scanning unit, wherein the regulating device triggers the light source to cause a change of an illumination state of the light source, wherein successive changes of the illumination state of the light source contain information regarding the amplitude of the analog scanning signal.

Accordingly, the scanning unit of the position-measuring arrangement has a regulating device for controlling the amplitude of a position-dependent analog scanning signal of the scanning unit, and a display unit for signaling the amplitude. The regulating device is laid out to control at least one light source of the display unit in such a way, that it causes a change in the lighting state of the light source, which contains information regarding the instantaneous amplitude size. It is particularly advantageous, if the number of sequential changes constitutes a measure of the amplitude of the scanning signal.

Here, a measurement of the amplitude relates either directly to the magnitude of the amplitude at the moment, or to the deviation between the instantaneous amplitude and a desired nominal amplitude.

The regulating device is preferably designed to put the light source into at least four states, with can be differentiated from each other, within a range of between 60% to 100% of the desired nominal amplitude, wherein these states differ in the number of changes in the lighting state. Through this measure, the operator is provided with information capable of indicating the tendencies of the amplitude, wherein the number of changes of the lighting state visible to the observer almost continuously changes over the range of 60% to 100% of the desired nominal amplitude. This visible indication, generated in this way, is a sort of digital indication representing the measurement of the amplitude.

The change in the lighting state can be a change of the blinking frequency, a sort of a Morse code. In a particularly preferred manner, an interruption of the lighting of the light source of the display unit, wherein the number of interruptions respectively following each other at identical time intervals, is a measure of the amplitude of the scanning signal. In connection with the particularly preferred exemplary embodiment, the time intervals between the interruptions following each other, i.e., the frequency, is the same in connection with all amplitudes, so that with all amplitudes the operator need only count the number of the interruptions which follow each other, and can interpret this number unequivocally as the measure of the amplitude. An interruption of the illumination of the light source corresponds to a shut-off of the light source.

In one embodiment of the present invention, the regulating device has a first regulating device, which is laid out to trigger the light source of the display unit in such a way that it interrupts the light source of the display unit as a function of the amplitude, wherein the number of interruptions, which respectively follow each other at equal time intervals, is a measurement of the amplitude of the scanning signal. In addition, the regulating device has a second regulating device, which is laid out to change the luminosity of this light source, or of another light source of the display unit, proportionally to the amplitude of the scanning signal. Preferably, both regulating devices trigger a common light source wherein, on the one hand, the luminosity of this light source increases when the amplitude varies toward the desired nominal amplitude, and simultaneously lighting is interrupted in preset short time intervals. These interruptions are of such nature that they can be counted by the operator, and the number of interruptions which follow each other represents a measurement of the amplitude of the scanning signal. The length of time of illumination between two successive interruptions is greater than the length of an interruption itself. Thus, for the operator, the information regarding the luminosity remains easily visible as criteria of the quality of the amplitude.

In a further preferred embodiment, the display unit includes two light sources, in which respectively both light sources are triggered by the first, as well as the second regulating device, and the second regulating device inversely changes the luminosity of both light sources with respect to each other. In this case, one of the two light sources shines green, and the other of the two light sources shines red. In case of a variation of the amplitude toward the desired nominal amplitude, the luminosity of the green-shining light source is increased, while in contrast the luminosity of the red-shining light source is reduced.

A position-measuring arrangement with a scale and a scanning unit that moves relative to the scale and scans the scale. The scanning unit including a display unit having a light source. The scanning unit further including a regulating device for controlling an amplitude of an analog scanning signal of the scanning unit, wherein the regulating device triggers the light source to cause a change of an illumination state of the light source, wherein successive changes of the illumination state of the light source contain information regarding the amplitude of the analog scanning signal.

Details, as well as advantages of the present invention ensue from the description of an exemplary embodiment of the present invention by the drawing figures which follows. Shown therein are:

DETAILED DESCRIPTION OF THE PREFERRED EMBODIMENTS

Figure 1:
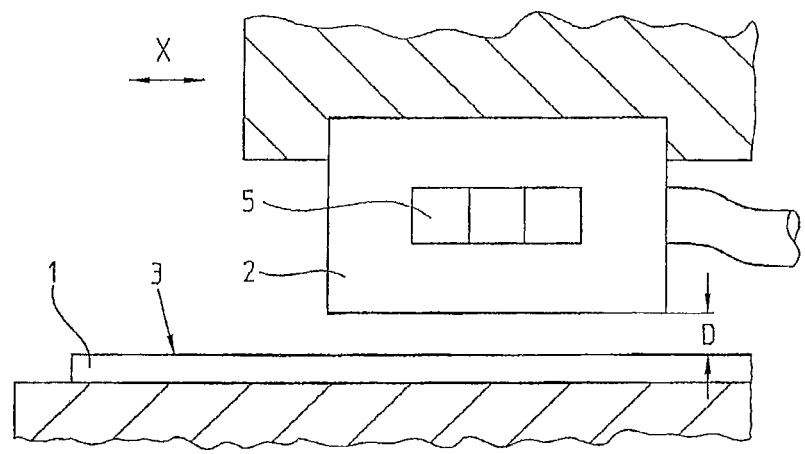
FIG. 1 shows an embodiment of a position-measuring arrangement with a scanning unit and a display unit in accordance with the present invention.

The position-measuring arrangement represented in FIG. 1 includes a scale 1 and a scanning unit 2. For example, the scale 1 is a measuring tape, which has on its surface a graduation 3, including alternatingly reflecting and non-reflecting areas. The scanning unit 2 scans the graduation 3 of the scale 1 in the measuring direction X and in the process generates several periodic scanning signals S1, S2, phase-shifted with respect to each other by 90°, also called quadrature signals, wherein $S1=A\times\sin a$, and $S2=A\times\cos a$. The amplitude A of these scanning signals S1, S2 is a function of the position of the scanning unit 2 in relation to the scale 1, in particular of the scanning distance D. In connection with the ability of the position-measuring arrangement to function during measuring operations it is required that the amplitude A does not fall below a defined value. Thus, during the mounting of the scanning unit 2 relative to the scale 1 it is particularly important to set the position with respect to the scale 1 in such a way, that the amplitude A is of a sufficient size, at least close to the desired nominal amplitude (1V in the example).

Now there are several options, known per se, for generating an amplitude-proportional signal, representing the amplitude A, from several scanning signals, phase-shifted by 90° with respect to each other.

One of the simplest options consists in forming it by calculation by $A=\sqrt{(S1^2+S2^2)}$, wherein S1 and S2 are the magnitude of the signals S1 and S2, respectively.

Figure 2:
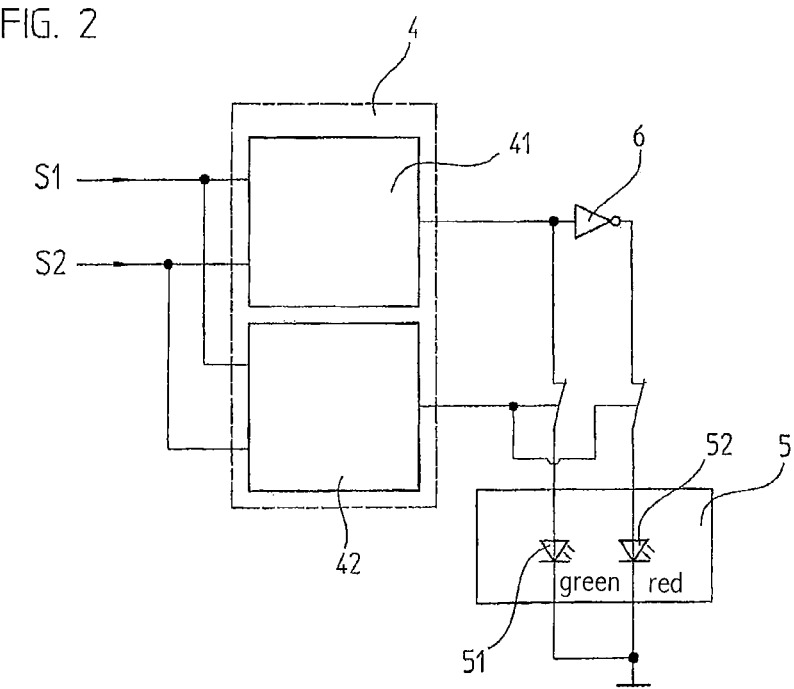
FIG. 2 shows an embodiment of a control unit to be used with the display unit of the scanning unit of FIG. 1 in accordance with the present invention.
Figures 3, 4:
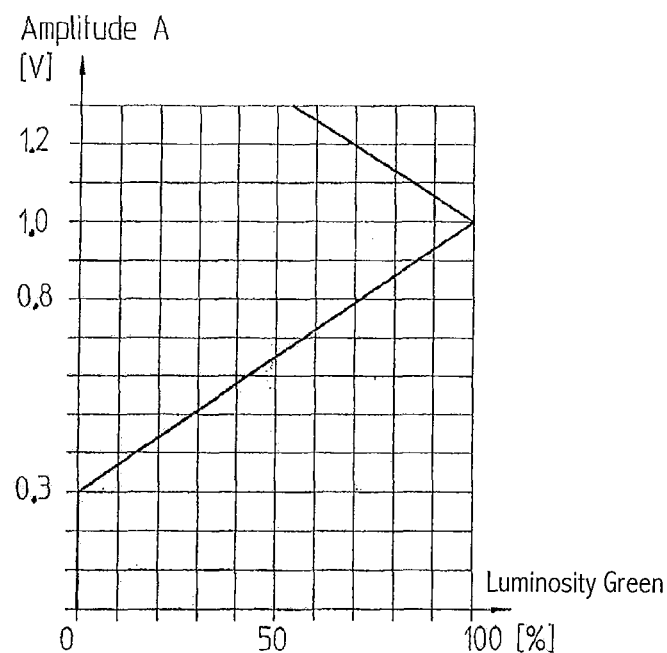
FIG. 3 shows a possible progression of a triggering signal of the display unit of FIGS. 1-2 as a function of the amplitude in accordance with the present invention.
FIG. 4 shows a possible representation in the form of a table of the triggering of the display unit of FIGS. 1-2 as a function of the amplitude in accordance with the present invention.

FIG. 2 in DE 101 57 112 A1 shows an alternative option. A multiplexer is employed, which on the one hand is supplied with four scanning signals $S1=A\times\sin a$, $S2=A\times\cos a$, $S3=-A\times\sin a$, $S4=-A\times\cos a$, and which on the other hand is supplied with switching signals by control inputs. The switching signals are generated from the scanning signals S1 to S4 by a comparator circuit having two comparators. Here, the multiplexer selects from the scanning signals S1 to S4 the one of the maximum amplitude and combines these selected scanning signals S1 to S4 into a generating curve, which represents the amplitude signal. The amplitude signal is directly proportional to the current amplitude A of the scanning signals S1 to S4. The signals in this connection are represented in FIG. 3 of DE 101 57 112 A1, to which express reference is made here.

The amplitude signal proportional to amplitude A can also be generated by known rectifier circuits, for example in accordance with DE 44 28 673 A1.

Returning to FIGS. 1 and 2, the scanning unit 2 has a regulating device 4 for controlling the amplitude A of the scanning signals S1, S2. The regulating device 4 controls the display unit 5, which signals the current state of the amplitude A to the operator.

To this end, the regulating device 4 includes a regulating device 41 as shown in FIG. 2, which is laid out to vary the luminosity of two light sources 51, 52 of the display unit 5 as a function of the amplitude A of the scanning signals S1, S2. The first light source 51 shines green and changes its luminosity as a function of the amplitude, such as represented in FIG. 3. In this example the desired nominal amplitude is assumed to be 1V. The luminosity of the first light source 51, i.e. the light source 51 shining green, is recited in FIG. 4 as a function of the amplitude A in percent.

The regulating device 41 additionally triggers the second light source 52, which shines red, and also changes its luminosity as a function of the amplitude A of the scanning signals S1, S2. The dependency of the luminosity of this red-shining light source 3 is represented in the table shown in FIG. 4. The luminosity of the red light source 52 changes opposite to the luminosity of the green light source 51, which in switching technology is symbolized by an inverter 6 shown in FIG. 2. If the amplitude A of the scanning signals S1, S2 lies below 0.3V, the red light source 52 alone shines at maximum luminosity, i.e. 100%. If the amplitude A is altered so as to approach the desired nominal amplitude of 1V, the luminosity of the red light source is continuously reduced down to 0%. The luminosity of the green light source 51 changes inversely to this, i.e., increasing continuously up to reaching 100% by the nominal amplitude of 1V of the scanning signals. By this opposed changing of the luminosity of both light sources 51, 52 a continuous color mixture is generated, from which the user obtains a usable indication regarding the actual state of the instantaneous amplitude A.

During mounting of the scanning unit 2, it is particularly important that the position of the scanning unit 2 with respect to the scale 1 be set in such a way that the amplitude comes to lie at least close to the nominal amplitude of 1V. Now, in order to provide the operator with still more information regarding the actual amplitude A, in particular in a range of approximately 60% to 100% of the desired nominal amplitude, and in this way to provide the actual mounting state, a further regulating device 42 is provided in accordance with the present invention. This regulating device 42 is laid out for triggering the two light sources 51, 52 of the display unit 5, at least with amplitudes A located within the range of the desired nominal amplitude A (60% to 100% of the desired nominal amplitude), in such a way as to interrupt the operation of the light sources 51, 52 as a function of the amplitude A, wherein the number of the interruptions respectively following each other at equal time intervals t is a measure of the amplitude A of the scanning signals S1, S2.

Figure 5A:
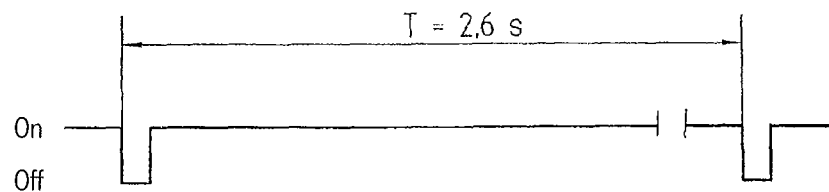
FIGS. 5a, 5b, 5c show a possible chronological triggering of the display unit of FIGS. 1-2 in accordance with the present invention.
Figure 5B:
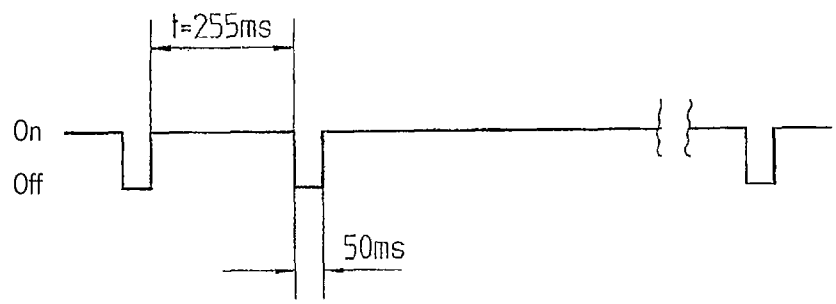
Figure 5C:
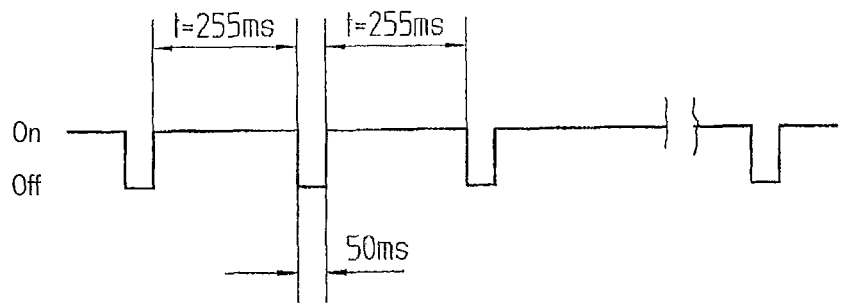

In FIG. 4, the number of interruptions as a function of the amplitude is called "blinking". In a chronological diagram, FIGS. 5*a*, 5*b* and 5*c* show how the two light sources 51, 52 are triggered. The number of interruptions following each other at equal intervals t is a measure of the instantaneous amplitude A. If the amplitude A lies within a range of 0.95 to 1.05V, the light sources 51, 52 are interrupted once within a cycle T, as represented in FIG. 5*a*. If the amplitude A lies within a range of 0.85 to 0.95V, the two light sources 51, 52 are interrupted twice, as represented in FIG. 5*b*. If the amplitude A lies within a range of 0.75 to 0.85V, the two light sources 51, 52 are interrupted three times, as represented in FIG. 5*c*. The interruptions occur at all amplitudes A in successive equal intervals t, in the example, t=255 ms, wherein the time of respectively one interruption is 50 ms. The time of one interruption (in the example 50 ms) is much shorter than the following time of illumination until the next interruption (in the example 255 ms). The cycle of interruptions is repeated within a fixed time grid T, here in the example 2.6 s. It should be especially noted that the frequency of the interruptions is not used as a measurement of the amplitude A, but only the number of interruptions, wherein the frequency of successive interruptions within a cycle T is the same at all amplitudes A. Thus, the operator obtains improved information regarding the actual status of the amplitude A by simply counting the successive interruptions of the light sources 51, 52 occurring within a cycle. The number of interruptions, i.e. the successive switched-off states of the light source 51, 52 continuously changes, at least within the range of 60% to 100% of the nominal amplitude.

With respect to the diagrams of FIGS. 5*a-c*, multiple cycles will follow each other in a serial manner. The observer must distinguish the periods T in the range between 60% and 100% of the desired nominal amplitude. In the case where the amplitude is 0.6V (60% of a desired nominal amplitude of 1 V), the ON duration of the last blink of one period and the first blink of the next period is 1330 ms which is a good deal larger than the ON duration of 255 ms in one period T of 2.6 s shown in FIGS. 5*a-c*. Note that it is not necessary that the observer distinguish the periods T in the range under 60%, if the information of a large number of blinking is enough for the observer to decide that this range of amplitudes is not sufficient.

The exemplary embodiment represented is particularly advantageous in that the two light sources 51, 52, being triggered by the regulating device 42, are interrupted in the same way. Since to the operator the amplitude A is of special interest in the vicinity of the nominal amplitude—here 1V—, i.e. within the range of approximately 60% to 100% of the nominal amplitude, it would alternatively be only necessary to trigger the green-shining light source 51 by means of the regulating device 42, and its shining could be interrupted as a function of the amplitude A. A further alternative would be if one light source were triggered only by the regulating device 42.

Preferably, the light sources 51, 52 are light diodes, which can be attached in a space-saving manner, but still easily visible to the operator, to the scanning unit 2. The two light diodes 51, 52 are preferably placed into a common housing. Such an LED is also called a bicolor LED. If it is additionally intended to check the position of a reference marker arranged on the scale 1, it is also possible to integrate an additional differently colored light diode, in particular a blue one. Such a three-colored light-emitting diode is also called an RGB-LED.

The present invention can be employed in position, as well as in angle measuring. In this case, the scanning elements for generating the scanning signals can be opto-electrical elements, elements sensitive to magnetic fields, capacitive as well as inductive elements.

The foregoing description is provided to illustrate the present invention, and is not to be construed as a limitation. Numerous additions, substitutions and other changes can be made to the present invention without departing from its scope as set forth in the appended claims.

We claim:

1. A scanning unit of a position measuring unit for scanning a scale, the scanning unit comprising:
   a display unit comprising a light source; and
   a regulating device for controlling an amplitude of an analog scanning signal of said scanning unit, wherein said regulating device triggers said light source to cause a change of an illumination state of said light source, wherein a number of successive changes of said illumination state of said light source is a measure of said amplitude of said analog scanning signal; and
   wherein said regulating device puts said light source in a range between 60% to 100% of a nominal amplitude into at least four distinguishable states, wherein each of said at least four distinguishable states differ in a number of changes of said illumination state.

2. The scanning unit in accordance with claim 1, wherein said change of said illumination state is an interruption of shining of said light source of said display unit, and wherein said number of interruptions, which respectively follow each other at equal intervals, is a measure of said amplitude of said scanning signal.

3. A scanning unit of a position measuring unit for scanning a scale, the scanning unit comprising:
   a display unit comprising a light source; and
   a regulating device for controlling an amplitude of an analog scanning signal of said scanning unit, wherein said regulating device comprises:
   a first regulating device that triggers said light source of said display unit in such a way as to interrupt shining of said light source as a function of said amplitude, wherein said number of interruptions, respectively following each other at equal intervals (t), is a measure of said amplitude; and
   a second regulating device that changes a luminosity of said light source as a function of said amplitude, wherein said regulating device triggers said light source to cause a change of an illumination state of said light source, wherein successive changes of said illumination state of said light source contain information regarding said amplitude of said analog scanning signal.

4. The scanning unit in accordance with claim 3, wherein said display unit comprises a second light source and wherein said second regulating device changes a luminosity of said second light source as a function of said amplitude.

5. The scanning unit in accordance with claim 3, wherein said display unit comprises a second light source, wherein said second light source is triggered by said second regulating device, and wherein said second regulating device changes said luminosity of said light source and a luminosity of said second light source inversely to each other.

6. The scanning unit in accordance with claim 4, wherein said light sources shines green light and said second light source shines red light.

7. The scanning unit in accordance with claim 5, wherein said light sources shines green light and said second light source shines red light.

* * * * *